Nov. 11, 1941.   E. OTTO ET AL   2,262,197
ADJUSTABLE SHEAVE
Filed Dec. 16, 1935   4 Sheets-Sheet 1
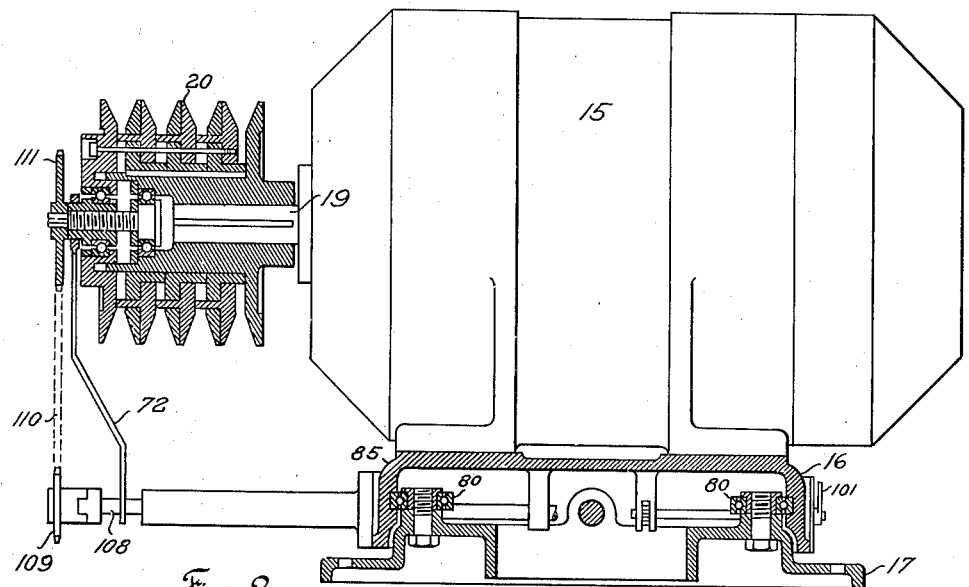
Fig. 2
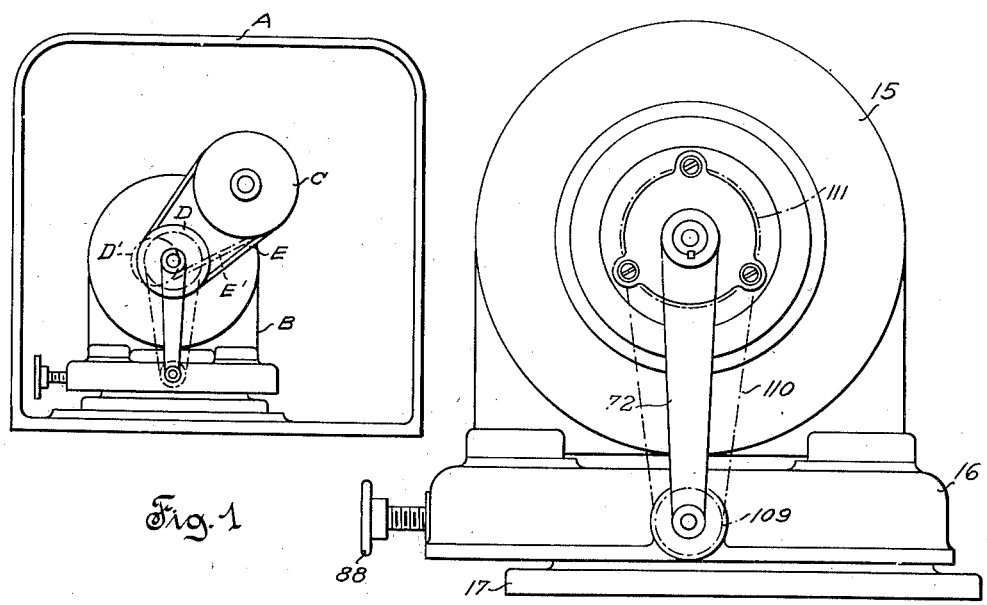
Fig. 1
Fig. 3
Inventors
E. Otto
C. Heinrich
by
Attorney Nov. 11, 1941.   E. OTTO ET AL   2,262,197
ADJUSTABLE SHEAVE
Filed Dec. 16, 1935   4 Sheets-Sheet 2

Inventors
E. Otto
C. Heinrich
by
Attorney

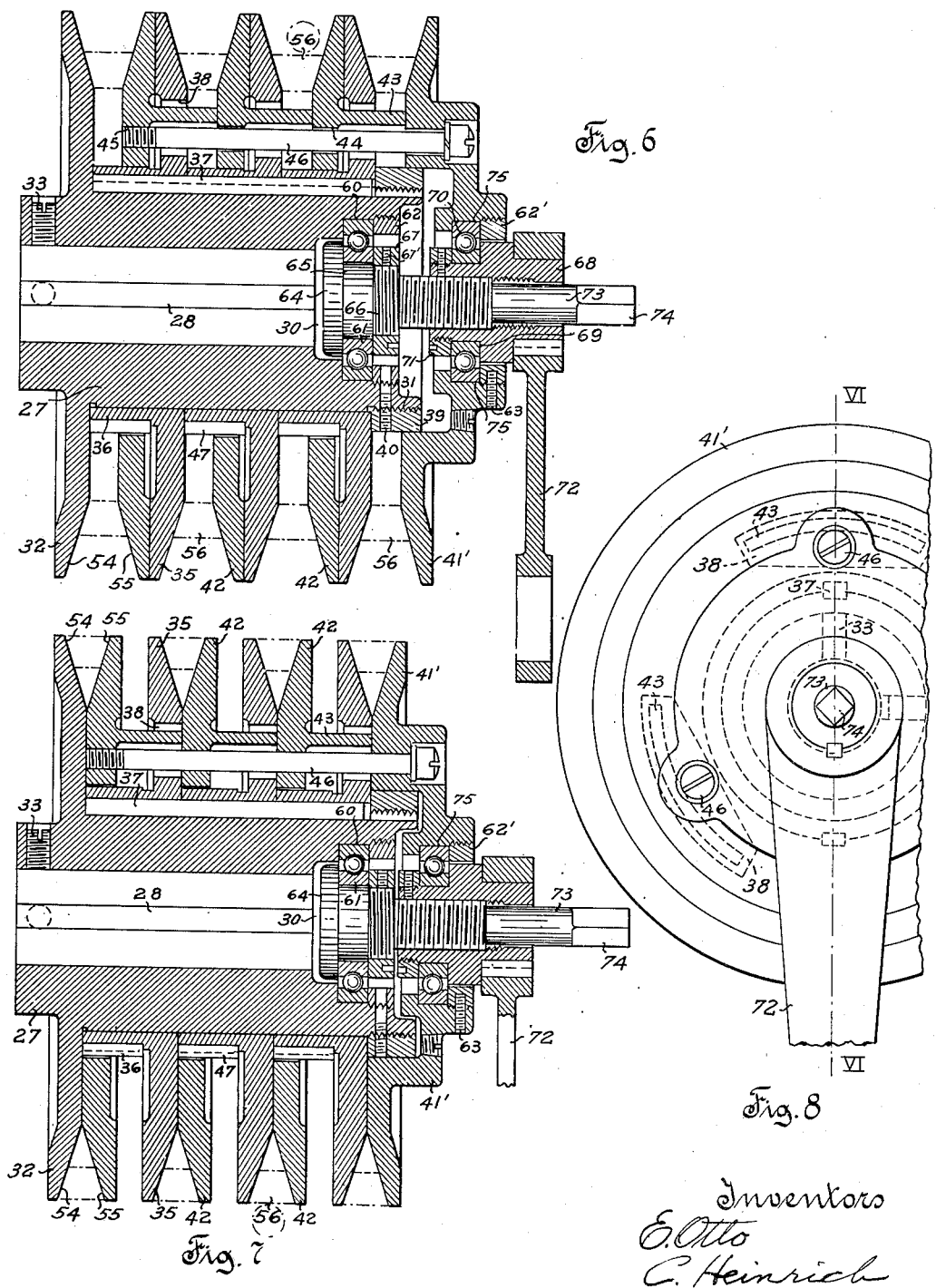

Nov. 11, 1941.  E. OTTO ET AL  2,262,197

ADJUSTABLE SHEAVE

Filed Dec. 16, 1935  4 Sheets-Sheet 4

Inventors
E. Otto
C. Heinrich
by
Attorney

Patented Nov. 11, 1941

2,262,197

UNITED STATES PATENT OFFICE 2,262,197

ADJUSTABLE SHEAVE

Eugene Otto and Casper Heinrich, Milwaukee, Wis., assignors to Allis-Chalmers Manufacturing Company, Milwaukee, Wis., a corporation of Delaware Application December 16, 1935, Serial No. 54,664

16 Claims. (Cl. 74—230.17)

This invention relates to variable speed power transmission, and especially to a multiple belt transmission wherein variation in speed is obtained by the use of sheaves of variable pitch diameter.

It is an object of this invention to provide a plural V-belt sheave having a variable pitch diameter and mounted on an adjustable base, so that the pitch diameter of the sheave and the position of the sheave on its support may be simultaneously varied, so that any desired belt tension may be maintained despite a variation in sheave diameter. It is a further object of this invention to provide an improved adjustable base for mounting variable pitch sheaves thereon.

It is a further object of this invention to provide an improved variable diameter V-groove sheave which is adapted to have its pitch diameter varied, while the sheave is rotating in use.

It is a further object of this invention to provide a multiple V-groove sheave comprising two relatively movable sets of conical disks, each set comprising a plurality of disks in alternating relation with disks of the other set, the disks of at least one set being spaced from adjacent disks of said set by rigid axial flanges integral with said disks and abutting adjacent disks of said set and passing through apertures in intervening disks of said other set. Further objects are to provide improved adjustable diameter sheaves in which said spacing flanges are arcuate in form; in which each set of disks is clamped by means of bolts passing radially within and symmetrically of said spacing flanges; and in which the actuator for changing the diameter of the sheave may be located substantially within the disks. Further objects will become apparent from the following specification and the claims appended hereto.

More specifically, this invention comprehends a multiple V-groove sheave of variable pitch diameter mounted on an adjustable base, with the sheave diameter varying means connected to the base adjusting means in such manner that any variation in pitch diameter of the sheave is accompanied by a movement of the sheave base so as to maintain the belts at any desired tension. The adjustable base of this invention is provided with a fixed subbase on which a movable base is mounted for yielding movement in a direction at an angle to the sheave axis, but is restrained against movement away from the subbase. The variable pitch sheave of this invention comprises a plurality of fixed disks mounted on a hub, and slidable disks mounted for axial movement on the hub and in alternate relation with said fixed disks, said slidable disks being uniformly spaced and clamped together to move as a unit, so that variations in diameter will be uniform and equal between each pair of complementary fixed and slidable disks. The sheave may have its pitch diameter adjusted while rotating in use; but in a modification a sheave is constructed in such manner as to be adjustable only when stationary.

For a clearer description of a specific construction illustrating this invention, reference is made to the drawings wherein:

Fig. 1 is a diagrammatic representation of a transmission employing a variable pitch sheave, and indicating the necessity for moving the sheave axis to compensate for the change in belt tension resulting from a change in pitch diameter;

Fig. 2 is a side elevation view, partly in section, of an assembly comprising a motor mounted on a movable base and carrying a variable pitch sheave;

Fig. 3 is an end elevation view of the assembly of Fig. 2 taken from the left of Fig. 2;

Fig. 6 is a sectional view taken along the lines VI—VI of Fig. 8 of another variable pitch sheave made in accordance with this invention, which sheave, here shown in its position of minimum pitch diameter, is adapted to have its diameter adjusted while the sheave is rotating in use;

Fig. 7 is a similar view of the same sheave, but adjusted to a maximum pitch diameter;

Fig. 8 is a fragmentary end view of the same taken from the right of Fig. 6;

Figure 4:
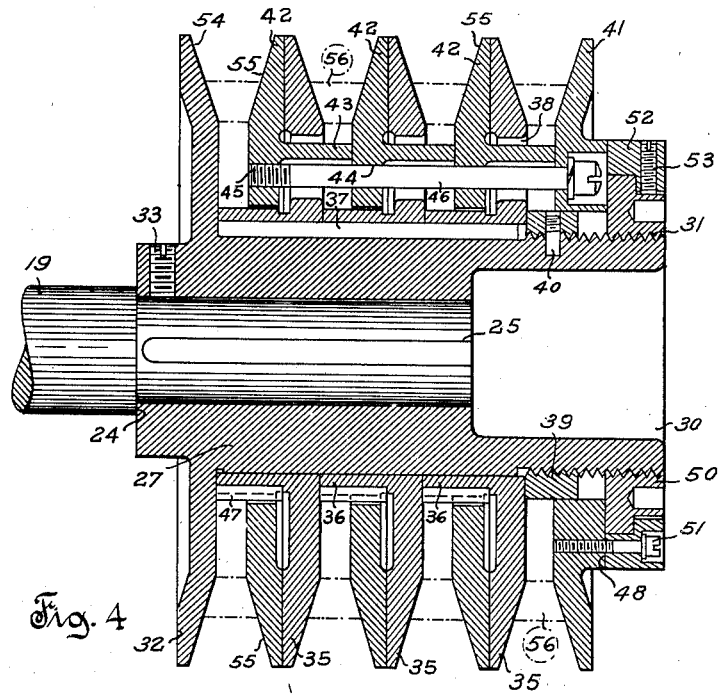
Fig. 4 is a sectional view taken along the line IV—IV of Fig. 5 of a variable pitch sheave made in accordance with this invention.

In the mechanical transmission of power, the use of resilient V-belts connecting driving and driven sheaves has come into increasing favor. One or both of such sheaves are generally provided with V-grooves, and the transmission of power from belt to sheave or vice versa takes place by friction contact between the sides of the belt and the sides of the groove.

In order to obtain a variation in speed of the driven shaft from a constant speed driving shaft, it has heretofore been necessary to stop the machine and replace one or both sheaves by sheaves of different diameter. This not only necessitates a waste of time, but also requires that a large number of sheaves of different diameter be kept in stock. At best, this system provides a limited number of available speeds, and consumes valuable time in effecting any change in speed.

According to this invention, a variable diameter sheave is provided which not only makes it possible to change the speed of a driven shaft without changing sheaves, but also provides an infinite number of speeds (within limits), and enables such change of speed to be made without even stopping the machine being operated. It is clear that where one of a pair of connected sheaves has its diameter changed, the tension of the belt between these sheaves is undesirably increased or decreased, dependent upon whether the sheave diameter is increased or decreased. To prevent this undesirable change in belt tension, the adjustable sheave is, according to the invention, mounted on an adjustable base, so that the position of the variable pitch sheave is changed when its diameter is changed, thus maintaining any desired belt tension.

Fig. 1 of the drawings illustrates the necessity for changing the relative spacing between sheaves when the effective diameter of one of the sheaves is changed. A standard spinning frame A has its mechanism actuated by rotation of sheave C which is driven by sheave D mounted on the shaft of motor B. A belt E connects driving sheave D and driven sheave C. If now a smaller diameter sheave D¹ be substituted for sheave D, it is clear that belt E will become too slack to transmit power. Hence it will be necessary to move the motor to the left so that the pulley D¹ will assume the position shown in dotted lines in Fig. 1, in order that the desired belt tension will be restored, the new position of the belt being shown at E¹.

As shown in Fig. 2, one aspect of this invention comprises an arrangement for changing the diameter of a variable pitch pulley 20, mounted on shaft 19 of motor 15, and simultaneously changing the position of the motor and its movable base 16 on the fixed subbase 17, by means of a single actuator 88 as will be described below.

A simple adjustable plural belt sheave according to this invention is shown in Fig. 4. The sheave is mounted on a shaft 19 and abuts a shoulder 24 on the shaft, which is provided with a keyway 25. The sheave comprises a hub 27 provided with a complementary keyway 28, and a key 29 retains the hub from rotary movement with respect to the shaft, in known manner. The hub is provided with a counterbore 30 and a threaded portion 31. A fixed end flange 32 may be integral with the hub, as shown. Axial movement of the hub on the shaft is prevented by set screw 33.

Mounted on the hub 27 is a plurality of intermediate fixed disks 35, which are provided with mounting and spacing flanges or bosses 36 keyed to the hub at 37. It will be noted that the boss 36 of each fixed disk 35 abuts an adjacent fixed disk, assuring uniform spacing between adjacent fixed disks. The fixed disks 35 are held in abutting relation by lock nut 39, which is held from rotation by retaining pin 40. The disks 35 are provided with a plurality of alined arcuate slots or apertures 38.

Slidably mounted between each pair of fixed disks are similar disks 42 which are provided with a plurality of integral spacing flanges 43 which pass freely through slots or apertures 38 in the fixed disks. Passing through alined holes 44 in the movable disks and through apertures 38 in the fixed disks are a plurality of bolts 46 threaded into the movable end disk 42. The right end movable disk 41 is generally similar to the other movable disks, and is movable over the periphery of lock nut 39. It will therefore be seen that the movable disks 41 and 42 are clamped together by bolts 46 to move as a unit axially of the hub 27, rotary movement with respect to the hub being prevented by keys 47.

The end movable disk 41 is provided with an abutment surface 48 against which abuts adjusting nut 50, which is threaded on the threaded portion 31 of the hub. The movable disk unit is adapted to move axially of the hub with the adjusting nut 50, which is held in abutting relation with the abutment surface 48 by means of retaining nut 52, which is fixed to the end movable disk 41 by means of screws 51.

Figure 5:
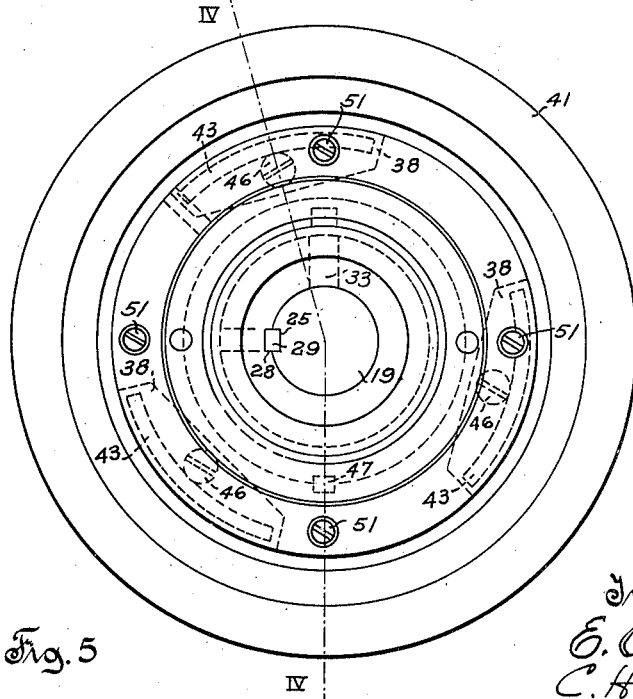
Fig. 5 is an end view of the same taken from the right of Fig. 4.

Fixed disks 32, 35 and slidable disks 41, 42 are provided with complementary conical belt receiving surfaces 54, 55 respectively, to coact with a plurality of V-shaped or trapezoidal belts 56. In the position shown in Fig. 4, with the slidable disks spaced from their complementary fixed disks, the sheave has a minimum pitch diameter, and the belts cooperate with the inner portions of the belt coacting surfaces 54, 55. If it is now desired to increase the effective pitch diameter, set screw 53 is unscrewed to release adjusting nut 50, and the adjusting nut is rotated in a clockwise direction (as seen in Fig. 5) as by means of a pin spanner wrench. This causes the adjusting nut to move axially to the left, as seen in Fig. 4, and causes movement of all the slidable disks 41, 42 axially to the left, turning movement of the disks being prevented by keys 47. This movement of the slidable disks to the left decreases the width of the grooves, forcing the belts outward, and increasing the effective pitch diameter of the sheave. It will be noted that, the fixed disks being uniformly spaced by bosses 36 and the movable disks being spaced by flanges 43 and being all moved together as a unit, all of the grooves are maintained equal at all times, and the effective pitch diameters are likewise equal. When the desired variation in diameter has been obtained, set screw 53 is again tightened to prevent any possible undesired diameter variation, and the sheave is ready for use.

It will be noted that in order to effect a variation in diameter of the sheave shown in Figs. 4 and 5, it is necessary to stop the pulley. Also, where the pulley diameter is to be increased, it may be necessary to remove the belts from the sheave, as they may become jammed between the fixed and slidable disks and prevent the slidable disks from being moved to the left (Fig. 4). To do away with the need of stopping the sheave to make the desired change in effective diameter, and to provide for increasing the diameter without the necessity of removing the belts carried by the sheave, the modification shown in Figs. 6, 7 and 8 was devised, which makes it possible to adjust the pitch diameter of the sheave while the sheave is rotating.

The sheave of Figs. 6, 7 and 8 is basically similar to that of Figs. 4 and 5 in the provision of a hub 27 carrying fixed disks 32, 35 and slidable disks 42. The countersunk portion of the hub is provided with a bearing seat 60 in which is located a frictionless bearing 61 which is retained in place by lock nut 62. Mounted to rotate with the inner race of the ball bearing 61 is an adjusting plug 65 provided with a head 64 and which is clamped against the inner race of the bearing by lock nut 67, held against rotation with respect to plug 65 by pin 67[1].

Threadably mounted on the reduced threaded portion of adjusting plug 65 is an adjusting nut 68 which is provided with a bearing seat 69 for the inner race of frictionless bearing 70, a lock nut 71 being provided to hold the bearing in position. The end slidable disk 41[1] is provided with a bearing seat 75 for the outer race of ball bearing 70, which is held in place by lock nut 62[1]. An adjusting nut lever 72 is non-rotatably fixed to the adjusting nut 68, and the other end of the lever is attached to a relatively stationary portion of the frame or otherwise fixed against rotation, as described below. The shaft 73 of adjusting plug 65 is provided with a non-circular portion 74, which may be turned by a wrench or by a gear attached thereto, as may be desired, to adjust the sheave diameter.

With the sheave in the position shown in Fig. 6, the slidable disk of each cooperating pair is removed as far as possible from its cooperating fixed disk. The grooves formed by faces 54 and 55 are as wide as the structure will permit, and the V-belts 56 therefore ride at the bottoms of the grooves. This is the position of minimum effective pitch diameter. If the sheave is rotating, the outer races of the frictionless bearings 61 and 70 and their attached parts, the hub 27, the fixed and slidable disks 32, 35, 41[1], 42 and lock nuts 62 and 62[1] will be rotating; while the inner races of the ball bearings, adjusting plug 65, adjusting nut 68, lever 72, and lock nuts 67, 71 will be stationary.

If it is now desired to increase the effective pitch diameter of the sheave, it is only necessary to rotate the shaft 73 of plug 65, as by means of a wrench. Such rotation of adjusting plug 65 cannot result in axial movement of the plug, since this is prevented by bearing 61 which is held between head 64 of plug 65 on one side and lock nut 67 on the other. Rotary movement of adjusting plug 65 will cause axial movement of adjusting nut 68, which is threaded on plug 65, rotary movement of adjusting nut 68 being prevented by lever 72. Axial movement of adjusting nut 68 imparts axial movement to bearing 70 and slidable end disk 41[1] and therefore to the entire slidable disk unit. It should be noted that such movement can be effected whether the sheave be rotating or not.

If the sheave is rotating while the slidable disks are moved to the left as described above, the movement of the belts on and off the sheave will permit the grooves to be made smaller without jamming the belts between cooperating pairs of fixed and slidable disks. In this modification of the invention, therefore, the effective diameter can be increased without necessitating removal of the belts.

Fig. 7 shows the sheave of Fig. 6 with the slidable disks moved to the left to the limit of their movement, each slidable disk being shown contacting its complementary fixed disk. This forces the belts outward as shown in dotted lines, resulting in the maximum effective pitch diameter. An infinite number of steps between the maximum and minimum diameters can be obtained.

Figure 9:
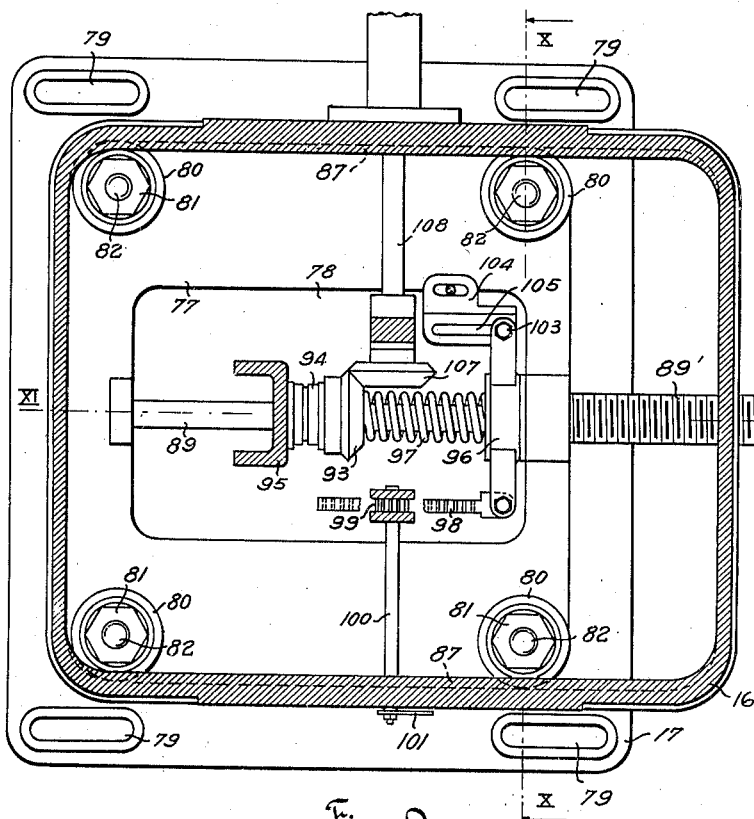
Fig. 9 is a sectional plan view of the adjustable base of this invention, taken along the line IX—IX of Fig. 11.
Figure 10:
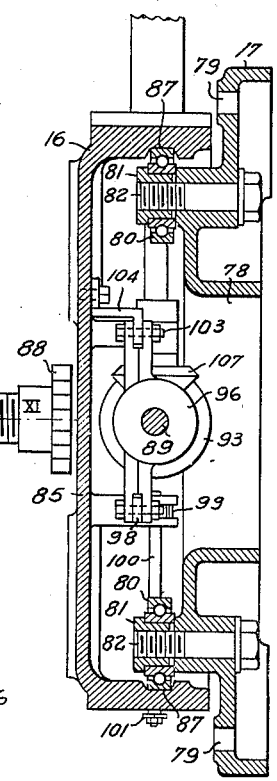
Fig. 10 is a sectional elevation view of the base taken along the line X—X of Fig. 9.
Figure 11:
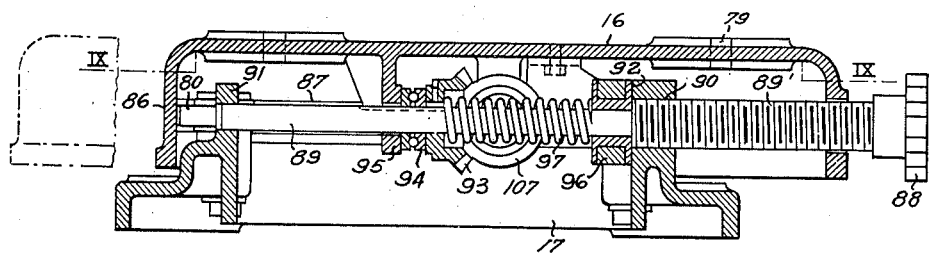
Fig. 11 is a sectional elevation view of the base taken along line XI—XI of Fig. 9.

Figs. 9 to 11, inclusive, show the details of the adjustable base on which the pulley and/or its driving motor may be mounted. The base comprises a fixed subbase on which a movable base is mounted for longitudinal movement relative thereto, one of said members being provided with guiding grooves engaged by bearing surfaces on the other member. A stationary subbase 17 is provided with a central aperture 78, and mounting apertures 79 are provided for attaching the subbase to any desired support. One of the bases, as for example, the subbase 17, carries a plurality of frictionless bearings 80, mounted on bearing retaining nuts 81, attached to the base by screws 82. Four such bearings are used in practice. The movable base 16 comprising a top 85 (on which a motor may be fixed) and sides 86, is provided with longitudinal bearing grooves 87, which cooperate with bearings 80 to permit substantially frictionless longitudinal movement of the movable base with respect to the fixed subbase, but prevent lateral movement thereof as well as movement away from the subbase. It is obvious that the grooves may be provided in the fixed subbase, and the bearings may be carried by the movable base, instead of the arrangement described above.

Movement of the base is effected by means of an actuator knob 88 attached to actuator shaft 89 provided with a threaded portion 89[1]. One end of shaft 89 is slidably supported in bearing 91, while threaded portion 89[1] cooperates with threaded bearing 90 for axial movement of the shaft upon rotation of knob 88.

A bevel gear 93 is slidably carried against rotation on shaft 89. The shaft 89 passes through an opening in flange 95, which may be integral with the movable base 16. A thrust bearing 94 is slidably mounted on shaft 89 between bevel gear 93 and bracket 95. A collar 96 which is free to rotate with respect to shaft 89 is mounted thereon adjacent shoulder 92 thereof, and a helical compression spring 97 is mounted on shaft 89 between collar 96 and bevel gear 93.

The collar 96 carries a rack 98 which cooperates with pinion 99 mounted on shaft 100 which is mounted for rotation on a side wall of base 16. On the outside of the base 16 shaft 100 carries a pointer 101, which cooperates with index marking (not shown) on the base. It will be seen that as knob 88 is rotated to move collar 96 axially of shaft 89, the movement of rack 98 will impart rotary movement to pinion 99 unless movable base 16 moves simultaneously with shaft 89, and pointer 101 will indicate the axial movement of the shaft relative to the movable base 16. The movement of collar 96 will impart movement to the movable base by exerting pressure through spring 97, gear 93 and thrust bearing 94, (which are free to slide longitudinally on shaft 89) to flange 95. If, due to increased belt tension, the movable base 16 does not move the same distance as does shaft 89, pinion 99 will be rotated by such differential movement, and pointer 101 will indicate the extent of the increased belt tension.

Carried in suitable brackets on movable base 16 is a shaft 108 which at one end carries a bevel gear 107 for cooperation with bevel gear 93. The other end of shaft 108 (see Fig. 2) carries a sprocket gear 109 which drives sprocket gear 111 through sprocket chain 110. Shaft 108 passes freely through an opening in the lower end of the adjusting nut lever 72, retaining lever 72 and adjusting nut 69 against rotation.

If it is desired to change the diameter of the sheave 20, actuator knob 88 is rotated in the desired direction to obtain movement of shaft 89, let us say to the left in Figs. 9 and 11. Bevel gear 93 will be rotated, causing rotation of bevel gear 107, shaft 108 and its sprocket gear 109. Thus sprocket gear 111 will be rotated, and since this is mounted on shaft 73 of adjusting plug 65, the effective diameter of the sheave will be changed as desired, as explained above.

Upon movement of the shaft to the left, the collar 96 will also be moved to the left. The movement of the shaft 89 will also impart movement to the movable base 84, through collar 96, spring 97, gear 93, thrust bearing 94 and bracket 95, thus compensating for the change in effective sheave diameter, and maintaining the desired belt tension.

Carried on the side of collar 96 opposite from rack 98 is a stop pin 103, adapted to slide in a longitudinal slot 105 of bracket 104. The ends of the slot determine the limits of movement of collar 96 and therefore of base 84.

It will be noted that, while simultaneous adjustment of the base and the sheave diameter are made possible by the movement of actuator 88, independent movement of the base in response to sudden changes in belt tension is also provided through the intermediary of spring 97, acting in a direction opposing the force due to belt tension. Should a sudden increase in tension occur (due to starting, changing speed, or other cause), the movable base 84 may be caused to move to the right (Fig. 11) against the pressure of spring 97. Gear 93 and thrust bearing 94 will simply slide along shaft 89, without rotation, so that no change in the diameter of the sheave results. Thus instantaneous jerks or changes in tension are cushioned and partly compensated by the yieldable coupling between the actuator and movable base. The spring also serves to maintain the desired belt tension despite possible stretching of the belt.

Instead of obtaining the desired adjustment by actuation of knob 88, it is clear that the same effect may be obtained by turning either sprocket gear 109 or 111 or by moving chain 110, to change the effective pitch diameter of the sheave. This will result in movement of the base through rotation of shaft 108 and its gear 107, with resultant rotation of bevel gear 93 and shaft 89. The construction therefore provides means whereby operation of the sheave adjusting means simultaneously changes the position of the base and operation of the base actuator simultaneously changes the effective sheave diameter.

From the above description the construction and operation of the movable base and variable pitch sheaves, as well as their joint operation, should be clear to those skilled in the art. Since numerous modifications thereof will be obvious to those skilled in the art, it is clear that the invention is not limited to the exact details of construction shown, but includes such variations and modifications as come within the scope of the appended claims.

It is claimed and desired to secure by Letters Patent:

1. A variable speed drive comprising a fixed subbase provided with frictionless bearings, a movable base mounted on said bearings for movement substantially parallel to said fixed subbase, an actuator threadably mounted for movement relative to said subbase, a resilient connection means between said actuator and said movable base, a motor provided with a shaft and fixed to said movable base, a variable pitch diameter plural groove sheave mounted on said motor shaft, said sheave comprising movable and fixed disks provided with converging complementary belt coacting surfaces, positive means for moving said movable disks relative to said fixed disks while the motor is operating, thus changing the effective diameter of said sheave, and means connecting said actuator to said sheave adjusting means, so that the sheave diameter is varied simultaneously with movement of said motor sheave and base relative to said fixed subbase.

2. A variable pitch diameter multiple groove sheave comprising a hub, alternate fixed and slidable disks on said hub provided with complementary inclined belt coacting faces, said slidable disks being clamped together for movement as a unit relative to said fixed disks, and an actuator assembly mounted for rotary movement relative to said sheave, said actuator assembly comprising a threaded member mounted in said hub and retained against axial movement relative to the hub, a complementary threaded member attached to the movable disk assembly and retained against axial movement relative thereto, means to fix said last named member against rotation with the sheave, and independent means for rotating said first threaded member to effect axial movement of the slidable disks.

3. A variable pitch diameter multiple groove sheave comprising a hub having a plurality of disks fixed thereto, a plurality of slidable disks on said hub in alternate relation with said fixed disks, said fixed and slidable disks being provided with complementary belt coacting surfaces, said slidable disks being clamped together for movement as a unit axially of the hub, and adjusting nut mounted for rotary movement with respect to the slidable disks but fixed against axial movement relatively thereto, a threaded adjusting plug mounted for rotary movement with respect to the hub, but fixed against axial movement relative thereto, said nut being threaded on said plug, means for preventing rotary movement of said nut, and means for angularly adjusting the position of said plug to effect axial movement of said nut and movable disk unit.

4. An adjustable multiple groove sheave, comprising a hub, a plurality of fixed disks secured on said hub in spaced relation and each presenting belt coacting faces inclined in the same sense, said fixed disks each having a transverse opening located inwardly of said belt coacting face, a plurality of slidable disks disposed on said hub alternately with said fixed disks and each presenting an inclined belt coacting face oppositely disposed to the belt coacting face of an adjacent fixed disk and complementary thereto to form therewith a belt receiving groove, said slidable disks having rearwardly extending spacing lugs integral therewith disposed through said openings in adjacent fixed disks and abutting adjacent slidable disks, means binding said spaced movable disks into a unit, and means for adjusting the axial position of said slidable disk unit relative to said fixed disks to regulate the width of said belt receiving grooves.

5. An adjustable multiple groove sheave comprising a cylindrical hub having at one end an integral disk presenting an inclined belt coacting face, a plurality of fixed disks each presenting a similarly inclined belt coacting face and having a rearwardly extending concentric cylindrical boss and each provided with a plurality of angularly spaced openings extending transversely therethrough located outwardly of said boss, said disks being arranged with said bosses functioning as spacers to position the disks in spaced relation, means on said hub binding said spaced disks immovably thereon, a plurality of movable disks slidably mounted on said cylindrical bosses of said fixed disks and having integral flanges extending through the openings of adjacent fixed disks into contact with the adjacent movable disks and each presenting a belt coacting face oppositely inclined to the faces of said fixed disks and disposed to cooperate with an adjacent disk to constitute therewith a belt receiving groove, means extending through the openings in said fixed disks binding said movable disks together as a unit, and adjustable means retaining said movable disks in predetermined relation to said fixed disks.

6. An adjustable multi-grooved sheave for cooperating with belts of V-shape cross section, comprising a cylindrical hub having at one end an integrally formed disk presenting an inclined peripheral belt coacting surface and having at its other end a screw threaded portion, a plurality of fixed disks mounted on said hub, each presenting an inclined peripheral belt coacting surface similar to the belt coacting surface of said integral disk and each provided with a central opening, an arcuate opening located between said central opening and said belt receiving surface and a rearwardly extending spacing lug, a nut threaded on said screw threaded end of said hub and binding said disks thereon with the spacing lugs of one disk engaging the face of the next disk, a plurality of movable disks slidably mounted on said hub in alternate relation to said fixed disks and each presenting an inclined peripheral belt coacting surface disposed opposite to and cooperating with the inclined surface of an adjacent fixed disk to form a V-groove, said movable disks having spacing lugs extending through the arcuate openings in adjacent fixed disks and engaging the next adjacent movable disks, means extending through said openings in said fixed disks and engaging said movable disks to bind them together, and means engaging said screw threaded end of said hub for moving said movable disks simultaneously to regulate the width of said grooves and consequently the effective pitch diameter of said pulley.

7. An adjustable sheave support comprising a subbase adapted to be fixed to a suitable support and provided with rotary bearings, a movable base mounted on said subbase for movement relative thereto and provided with grooved bearing surfaces cooperating with said rotary bearings, an apertured lug depending from said base, an actuator threadably mounted on said subbase and passing freely through said apertured lug, said actuator being provided with a shoulder, and a resilient member compressed between said shoulder and said lug.

8. A sheave comprising a hub, a plurality of disks fixed on said hub, axial spacing flanges integral with said fixed disks adjacent the hub and extending to adjacent fixed disks, means clamping said fixed disks in position on said hub; a plurality of slidable disks alternating with said fixed disks and mounted for axial movement on said fixed disk axial spacing flanges, axially extending flanges integral with said slidable disks abutting adjacent slidable disks and freely passing through apertures in intervening fixed disks, means for clamping said slidable disks together to move as a unit; and means for adjusting the axial position of said slidable disk unit.

9. A sheave as recited in claim 8, said slidable disk spacing flanges being arcuate in form, and the clamping means for the slidable disk unit comprising rods passing through said slidable disks and intervening fixed disks at points radially within said spacing flanges and symmetrically thereof.

10. A multiple V-belt pulley comprising a hub, a plurality of fixed and slidable disks mounted on said hub in alternating relation, said slidable disks being spaced from adjacent slidable disks by rigid axial flanges integral with said slidable disks and abutting adjacent slidable disks, said flanges being arcuate in form and concentric with said hub.

11. A pulley as claimed in claim 2, said actuator assembly being contained substantially within said disks.

12. A variable speed drive comprising a motor provided with a shaft mounted on an adjustable base; a variable pitch sheave mounted on said shaft and comprising a plurality of fixed disks, a plurality of axially adjustable disks alternating with said fixed disks and an actuator for effecting axial adjustment of said slidable disks, said actuator comprising a threaded member axially fixed with respect to said shaft; means for adjusting the position of said motor on said adjustable base, an axially stationary connecting member connected for rotation by movement of said motor adjusting means; and means for rotating said actuator upon rotation of said connecting means.

13. A sheave comprising a hub, a plurality of disks mounted on said hub and arranged as a unitary set, axial spacing flanges integral with said disks adjacent the hub and extending to adjacent disks of said set; a second set of disks comprising a plurality of disks alternating with said disks of said first set and mounted for relative axial movement on said axial spacing flanges of the disks of said first set; axially extending flanges integral with said disks of said second set abutting adjacent disks of said second set and freely passing through openings in intervening disks of said first set; means for clamping said disks of said second set together to move as a unit; and means for adjusting the relative axial position of said sets of disks.

14. A multiple V-belt pulley comprising a central support, two relatively movable sets of disks each set comprising a plurality of disks mounted on said support in alternating relation with disks of the other set, the disks of at least one set being spaced from adjacent disks of said set by rigid axial flanges integral with said disks and abutting adjacent disks of said set, said flanges being arcuate in form and concentric with said support.

15. A sheave comprising a hub, a plurality of disks mounted on said hub and arranged as a unitary set, axial spacing flanges integral with said disks adjacent the hub and extending to adjacent disks of said set; a second set of disks comprising a plurality of disks alternating with said disks of said first set and mounted for axial movement relative to said first set of disks on said hub; axially extending flanges integral with said disks of said second set abutting adjacent disks of said second set and freely passing through openings in intervening disks of said first set; means for clamping said disks of said second set together to move as a unit; and means for adjusting the relative axial position of said sets of disks.

16. A pulley comprising a hub, a first disk unit comprising a plurality of disks mounted on said hub in spaced relationship, a second set of disk units comprising a plurality of disks mounted on said hub in alternating relation with said first disks and clamped together to move as a unit relatively to said first disk unit, and actuating means substantially within said disks for adjusting the relative position of said disk units.

EUGENE OTTO.
CASPER HEINRICH.